US011981547B2

(12) United States Patent
Minami

(10) Patent No.: US 11,981,547 B2
(45) Date of Patent: May 14, 2024

(54) CRANE

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 422 days.

(21) Appl. No.: 17/420,907

(22) PCT Filed: Jan. 21, 2020

(86) PCT No.: PCT/JP2020/001847
§ 371 (c)(1),
(2) Date: Jul. 6, 2021

(87) PCT Pub. No.: WO2020/153325
PCT Pub. Date: Jul. 30, 2020

(65) Prior Publication Data

US 2022/0063965 A1 Mar. 3, 2022

(30) Foreign Application Priority Data

Jan. 23, 2019 (JP) ................................ 2019-009724

(51) Int. Cl.
*B66C 13/46* (2006.01)
*B66C 13/00* (2006.01)
(Continued)

(52) U.S. Cl.
CPC .............. *B66C 13/46* (2013.01); *B66C 13/00* (2013.01); *B66C 13/48* (2013.01); *B66C 23/42* (2013.01); *B66C 2700/067* (2013.01)

(58) Field of Classification Search
CPC ......... B66C 13/46; B66C 13/00; B66C 13/48; B66C 23/42; B66C 2700/067
See application file for complete search history.

(56) References Cited

U.S. PATENT DOCUMENTS

2013/0120577 A1 5/2013 Austefjord et al.
2015/0249821 A1 9/2015 Tanizumi et al.
2020/0024109 A1* 1/2020 Rytkönen ............... H04N 23/60

FOREIGN PATENT DOCUMENTS

CN 104609303 A 5/2015
CN 102862915 B * 7/2015 ........... B66C 23/905
(Continued)

OTHER PUBLICATIONS

Inukai et al.; Control of a Boom Crane Using Installed Stereo Vision; 2012 Sixth International Conference on Sensing Technology (ICST); pp. 189-194 (Year: 2012).*
(Continued)

*Primary Examiner* — Michael J Zanelli
(74) *Attorney, Agent, or Firm* — Paratus Law Group, PLLC

(57) ABSTRACT

The present invention addresses the problem of providing a crane capable of detecting a suspension location of a payload, in order to enable accurate positioning of a hook at the suspension location of the payload. This crane comprises: a freely derricking boom provided to a swivel; and a sub-hook block and a sub-hook suspendedly provided from the boom. The crane also comprises: a boom camera capable of imaging a payload that is to be carried by the crane; hook cameras capable of imaging the payload from different viewpoints than the boom camera; and a control device for controlling the crane. The control device acquires images obtained by imaging the payload with the boom camera and the hook cameras, runs image processing on the images, and calculates a suspension location of the payload.

8 Claims, 10 Drawing Sheets

(51) Int. Cl.
*B66C 13/48* (2006.01)
*B66C 23/42* (2006.01)

(56) References Cited

FOREIGN PATENT DOCUMENTS

| | | | | | |
|---|---|---|---|---|---|
| CN | 104854017 | A | * | 8/2015 | ............. B66C 13/16 |
| CN | 105152047 | A | * | 12/2015 | |
| CN | 107298381 | A | | 10/2017 | |
| EP | 2899496 | A1 | | 7/2015 | |
| JP | 2000086159 | A | * | 3/2000 | |
| JP | 2018-030692 | A | | 3/2018 | |
| JP | 2018-095370 | A | | 6/2018 | |
| JP | 2018-095375 | A | | 6/2018 | |
| WO | WO-2010009570 | A1 | * | 1/2010 | ............. B66C 13/46 |
| WO | WO 2011/135310 | A2 | | 11/2011 | |

OTHER PUBLICATIONS

Apr. 7, 2020, International Search Report issued for related PCT application No. PCT/JP2020/001847.
Apr. 7, 2020, International Search Opinion issued for related PCT application No. PCT/JP2020/001847.
Sep. 14, 2022, European Search Report issued for related EP Application No. 20744525.5.

* cited by examiner

CRANE

CROSS REFERENCE TO PRIOR APPLICATION

This application is a National Stage Patent Application of PCT International Patent Application No. PCT/JP2020/001847 (filed on Jan. 21, 2020) under 35 U.S.C. § 371, which claims priority to Japanese Patent Application No. 2019-009724 (filed on Jan. 23, 2019), which are all hereby incorporated by reference in their entirety.

TECHNICAL FIELD

The present invention relates to a crane.

BACKGROUND ART

Conventional cranes are known to have a technology for automatically transporting a lifted load to a desired installation position. For example, it is as disclosed in PTL 1.

The crane disclosed in PTL 1 can automatically convey a lifted load to a desired installation position. In the crane described in PTL 1, a sensor is installed at the end of the boom or jib to detect the area occupied by an object, and by detecting an object existing in a predetermined scanning range, it is possible to insert and install a load between multiple pillars or structures that have already been installed by automatic operation, thus making it possible to accurately position and transport a load to the desired installation position without causing contact with obstacles.

However, current cranes are unable to detect a suitable position for lifting a load (hereinafter referred to as the lifting position), so when a load is slung onto a hook, the hook is moved to the vicinity of the load by the operator. In other words, conventional cranes, such as the one described in PTL 1, cannot detect the lifting position of a load, and therefore cannot automatically position the hook at the lifting position of the load.

CITATION LIST

Patent Literature

PTL 1

Japanese Patent Application Laid-Open No. 2018-030692

SUMMARY OF INVENTION

Technical Problem

An object of the present invention is to provide a crane that can detect a lifting position of a load so that a hook can be automatically positioned at the lifting position of the load.

Solution to Problem

The problem to be solved by the invention is as described above, and the means to solve this problem are described next.

A crane according to an embodiment of the present invention is a crane in which a boom configured to be freely raised and lowered is provided on a slewing platform, and a hook block and a hook suspended from the boom are provided, the crane including: a first camera configured to capture an image of a load as a carrying object that is carried by the crane; a second camera configured to capture an image of the load from a perspective different from the first camera; and a control apparatus configured to control the crane. The control apparatus acquires an image obtained by capturing the load by the first camera and the second camera, and calculates a lifting position of the load by performing image processing on the image.

In the crane according to an embodiment of the present invention, the first camera is provided at the boom; and the second camera is provided at the hook block.

In the crane according to an embodiment of the present invention, the control apparatus automatically moves the hook to the lifting position that is calculated.

In the crane according to an embodiment of the present invention, the lifting position is a position of a lifting tool provided in the load.

In the crane according to an embodiment of the present invention, the lifting position is a position set at a location above the load on a vertical line passing through a gravity center of the load.

In the crane according to an embodiment of the present invention, the control apparatus calculates the gravity center of the load by performing image processing on the image.

In the crane according to an embodiment of the present invention, the control apparatus is configured to communicate with a storage apparatus in which shape information of the load is stored, acquire the shape information of the load from the storage apparatus, and calculate the gravity center based on information obtained through the image processing on the image and the shape information of the load.

In the crane according to an embodiment of the present invention, the load is a composite composed of a plurality of the loads combined together.

In the crane according to an embodiment of the present invention, the control apparatus automatically moves the hook to the lifting position through a control based on an inverse dynamics model.

Advantageous Effects of Invention

The present invention achieves the following effects.

With the crane according to the embodiment of the present invention, the crane can detect the lifting position of the load. Thus, the hook can be automatically positioned at the detected lifting position of the load.

In addition, with the crane according to the embodiment of the present invention, the crane can detect the lifting tool of the load, and the hook can be automatically positioned at the position of the detected lifting tool.

In addition, with the crane according to the embodiment of the present invention, the crane can calculate the gravity center of the load and the lifting position can be set based on the information on the gravity center, and thus, the hook can be automatically positioned at the set lifting position.

In addition, with the crane according to the embodiment of the present invention, in the case where the load is a composite composed of a plurality of loads, the crane can calculate the gravity center of the load, and the lifting position can be set based on the information on the gravity center, and thus, the hook can be automatically positioned at the set lifting position.

In addition, with the crane according to the embodiment of the present invention, the hook can be automatically moved to the lifting position while suppressing the sway of the hook.

BRIEF DESCRIPTION OF DRAWINGS

FIG. 4 are drawings illustrating an image-capturing state of a load (with no marker) by a boom camera and a hook camera and a display state of a captured image.

FIG. 5 are drawings illustrating an image-capturing state of a load (with a marker) by the boom camera and the hook camera and a display state of a captured image.

FIG. 10 are drawings illustrating an image-capturing state of a load (with no marker) as a composite by the boom camera and the hook camera and a display state of a captured image, FIG. 11 are drawings illustrating an image-capturing state of a load (with a marker) as a composite by the boom camera and the hook camera and a display state of a captured image.

DESCRIPTION OF EMBODIMENTS

Crane 1, which serves as a crane (rough terrane crane) according to an embodiment of the present invention, is described below with reference to FIG. 1 and FIG. 2. It is to be noted that a rough terrane crane is described as an example in the present embodiment, but the crane according to the embodiment of the present invention may be cranes of other types such as an all-terrane crane, a truck crane and a loading truck crane.

Figure 1:
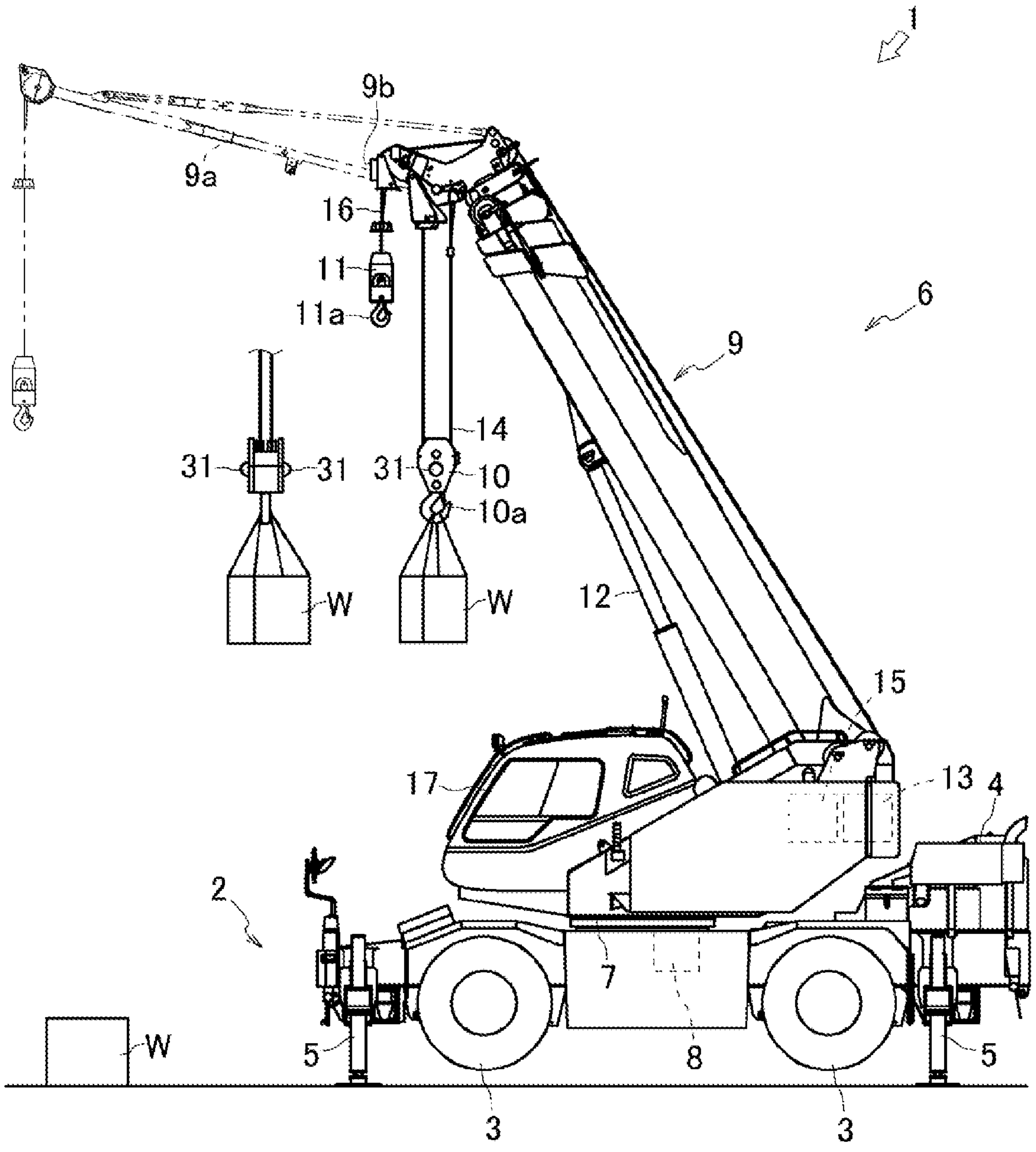
FIG. 1 is a side view illustrating a general configuration of a crane.

As illustrated in FIG. 1, crane 1 is a crane that can move to unspecified locations. Crane 1 includes vehicle 2 and crane apparatus 6.

Vehicle 2 is a traveling vehicle that carries crane apparatus 6. Vehicle 2 includes a plurality of wheels 3, and travels with engine 4 as a power source. Vehicle 2 is provided with outrigger 5. Outrigger 5 is composed of an overhang beam that is hydraulically extendable on both sides in the width direction of vehicle 2 and a hydraulic jack cylinder that is extendable in the direction perpendicular to the ground.

Crane apparatus 6 is, for example, a work machine that can hook and lift load W placed on the ground by a hook suspended from a wire rope. Crane apparatus 6 includes slewing platform 7, boom 9, main hook block 10, sub hook block 11, luffing hydraulic cylinder 12, main winch 13, main wire rope 14, sub winch 15, sub wire rope 16, cabin 17 and the like.

Slewing platform 7 is a rotary apparatus configured to make crane apparatus 6 slewable on vehicle 2. Slewing platform 7 is provided on the frame of vehicle 2 with an annular bearing therebetween. Slewing platform 7 is configured to be rotatable around the center of the annular bearing. Slewing platform 7 is provided with hydraulic slewing hydraulic motor 8 as an actuator. With slewing hydraulic motor 8, slewing platform 7 is configured to be slewable in a direction and another direction around the bearing.

Figure 2:
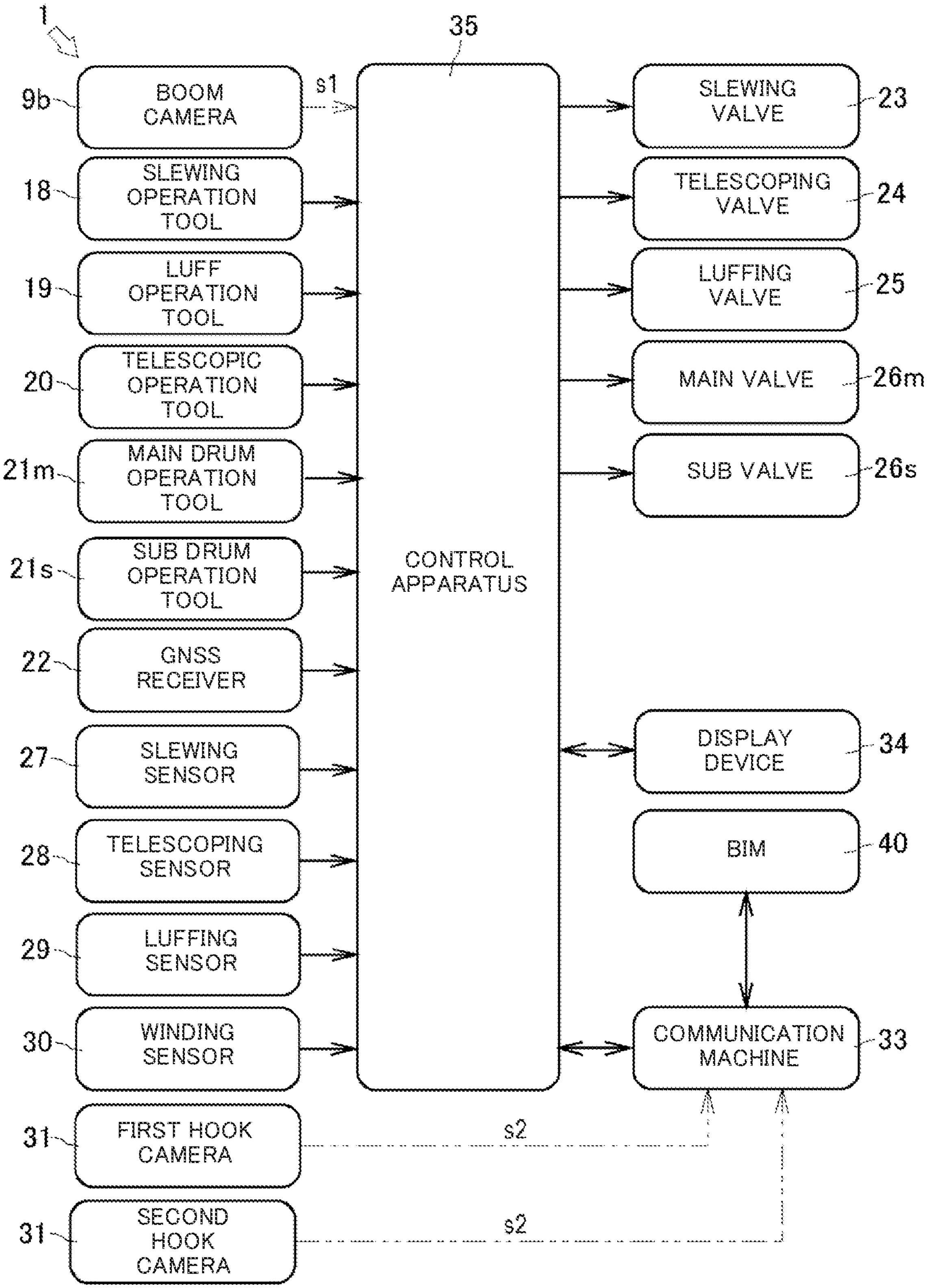
FIG. 2 is a block diagram illustrating a control configuration of the entire crane.

As illustrated in FIG. 1 and FIG. 2, slewing hydraulic motor 8 as an actuator is rotated and operated by slewing valve 23 as an electromagnetic proportional switching valve. Slewing valve 23 can control the flow rate of the operation oil supplied to slewing hydraulic motor 8, at any flow rate. That is, slewing platform 7 is configured to be controllable at any slewing speed through slewing hydraulic motor 8 that is rotated and operated by slewing valve 23. Slewing platform 7 is provided with slewing sensor 27.

Boom 9 is a movable support pillar that supports a wire rope in the state where load W can be lifted. Boom 9 is composed of a plurality of boom members. In boom 9, the base end of the base boom member is provided at an approximate center of slewing platform 7 in a swayable manner. Boom 9 is configured to be freely telescopic in the axial direction by moving each boom member by a telescoping hydraulic cylinder as an actuator not illustrated in the drawing. In addition, boom 9 is provided with jib *9a*.

The telescoping hydraulic cylinder as an actuator not illustrated in the drawing is telescopically operated by telescoping valve 24 as an electromagnetic proportional switching valve. Telescoping valve 24 can control the flow rate of the operation oil supplied to the telescoping hydraulic cylinder, at any flow rate. Boom 9 is provided with telescoping sensor 28 that detects the length of boom 9.

Boom camera *9b* as a detection apparatus captures an image of load W, ground object features around load W and the like. Boom camera *9b* is provided at an end portion of boom 9. Boom camera *9b* is configured to be capable of capturing the image of the ground from above, and acquiring captured image s1 of the state of the ground (ground object features and topographic features in the region around crane 1) and load W placed on the ground.

Main hook block 10 and sub hook block 11 are configured to suspend load W. Main hook block 10 is provided with a plurality of hook sheaves around which main wire rope 14 is wound, and main hook *10a* for suspending load W. Sub hook block 11 is provided with sub hook *11a* for suspending load W.

Luffing hydraulic cylinder 12 is an actuator that moves boom 9 up and down, and holds the orientation of boom 9. In luffing hydraulic cylinder 12, an end portion of the cylinder part is swayably coupled with slewing platform 7, and an end portion of the rod part is swayably coupled with the base boom member of boom 9. Luffing hydraulic cylinder 12 is telescopically operated by luffing valve 25 as an electromagnetic proportional switching valve. Luffing valve 25 can control the flow rate of the operation oil supplied to luffing hydraulic cylinder 12, at any flow rate. Boom 9 is provided with luffing sensor 29.

Main winch 13 and sub winch 15 perform feed-in (wind up) and feed-out (wind down) of main wire rope 14 and sub wire rope 16. In main winch 13, the main drum around which main wire rope 14 is wound is rotated by the main hydraulic motor as an actuator not illustrated in the drawing. In sub winch 15, the sub drum around which sub wire rope 16 is wound is rotated by the sub hydraulic motor as an actuator not illustrated in the drawing.

The main hydraulic motor is rotated and operated by main valve 26*m* as an electromagnetic proportional switching valve. Main winch 13 is configured to control the main hydraulic motor by main valve 26*m* so as to be operative at given feed-in and feed-out speeds. Likewise, sub winch 15 is configured to control the sub hydraulic motor by sub valve 26*s* as an electromagnetic proportional switching valve so as to be operative at given feed-in and feed-out speeds. Main winch 13 and sub winch 15 are provided with winding sensors 30 that detect feeding amount l of main wire rope 14 and sub wire rope 16, respectively.

Cabin 17 is a housing that covers an operation seat. Cabin 17 is mounted on slewing platform 7 and provided with an operation seat not illustrated in the drawing. The operation seat is provided with an operation tool for the travelling operation of vehicle 2, slewing operation tool 18 for the operation of crane apparatus 6, luff operation tool 19, telescopic operation tool 20, main drum operation tool 21*m*, sub drum operation tool 21*s* and the like. Slewing operation tool 18 can operate slewing hydraulic motor 8. Luff operation tool 19 can operate luffing hydraulic cylinder 12. Telescopic operation tool 20 can operate the telescoping hydraulic cylinder. Main drum operation tool 21*m* can operate the main hydraulic motor. Sub drum operation tool 21*s* can operate the sub hydraulic motor.

GNSS receiver 22 is a receiver constituting a global navigation satellite system (GNSS), and calculates the latitude, longitude, and altitude as the position coordinates of the receiver by receiving a distance measurement signal from a satellite. GNSS receiver 22 is provided at the end of boom 9 and cabin 17 (GNSS receivers 22 provided in the end of boom 9 and cabin 17 are hereinafter collectively referred to as "GNSS receiver 22"). That is, with GNSS receiver 22 of crane 1 side, crane 1 can acquire the position coordinates of the end of boom 9 and the position coordinates of cabin 17.

Hook camera 31 is an apparatus that captures the image of load W. Hook camera 31 is detachably provided to the hook block to be used among main hook block 10 and sub hook block 11 by means of a magnet or the like. FIG. 1 illustrates an exemplary case where a pair of hook cameras 31 is provided in main hook block 10. FIG. 4A, FIG. 4B, FIG. 5A, FIG. 5B, FIG. 7 and FIG. 8 illustrate exemplary cases where hook camera 31 is provided in sub hook block 11. Hook camera 31 is configured to be capable of changing the image-capturing direction by means of a control signal of crane apparatus 6. It is to be noted that while two or more hook cameras 31 are provided in consideration of the fact that the image of load W may not be captured depending on the positional relationship of load W and the orientation of main hook block 10 in the present embodiment, one hook camera 31 may be provided at a position where the visibility is not blocked by main hook block 10. In addition, while the camera (hook camera 31) provided in main hook block 10 is exemplified as cameras other than boom camera 9*b* in the present embodiment, it suffices that the image of load W can be acquired from a different perspective, and it is possible to adopt a configuration in which a camera is provided at a position where load W on the front side of cabin 17 can be visually recognized, in place of hook camera 31 provided in main hook block 10, for example.

It is to be noted that one of the plurality of hook cameras 31 is disposed at the side surface on one side of main hook block 10, and is configured as first hook camera 31 that can capture the image of load W on the ground surface. Another one of the plurality of hook cameras is disposed at the side surface on another side of main hook block 10, and is configured as second hook camera 31 that can capture the image of load W on the ground surface. Each hook camera 31 can transmit captured image s2 through radio communication and the like.

That is, as a camera that captures the image of load W, crane 1 is provided with boom camera 9*b* and hook camera 31, and is configured to be capable of acquiring images s1 and s2 of load W simultaneously captured from different directions.

As illustrated in FIG. 2, communication machine 33 receives data of image s2 from hook camera 31. In addition, communication machine 33 can acquire three-dimensional data of a structure and/or information on load W from building information modeling (BIM) 40 as a storage apparatus operated by an external server and the like. Communication machine 33 is configured to transfer image s2 to control apparatus 35 through a communication line not illustrated in the drawing when communication machine 33 receives image s2. Communication machine 33 is provided in cabin 17.

BIM 40 is a database in which attribute data of the three-dimensional shape, material, weight and the like of each material that constitutes a building added to a three-dimensional digital model created by a computer, and the database information can be used in every process including the design, construction, maintenance and management of a building. Load W is included in the "each material that constitutes a building" mentioned above. BIM 40 is composed of an external server or other device that can be accessed in real time, in which the aforementioned database information is registered. It is to be noted that while the present embodiment describes an exemplary case where BIM 40 composed of an external server is used as a storage apparatus that stores information on load W, it is also possible to adopt a configuration in which a storage apparatus preliminarily storing information on load W and the like is mounted in crane 1 such that the information on load W and/or the three-dimensional data of the structure can be acquired without performing communication with the outside.

Display device 34 is an output apparatus configured to be capable of displaying image s1 captured by boom camera 9*b* and image s2 captured by hook camera 31, and displaying the information calculated through image processing of images s1 and s2 in a superimposed manner. In addition, display device 34 functions as an input apparatus for an operator to designate the load for which the operator wants to obtain the lifting position (i.e., the target of the image processing). Display device 34 includes an operation tool such as a touch panel from which a load as the target of the image processing can be designated by tapping the image of the load displayed on the screen, and a mouse not illustrated in the drawing. Display device 34 is provided in cabin 17.

Control apparatus 35 controls each actuator of crane 1 through each operating valve. In addition, control apparatus 35 performs image processing of images s1 and s2 captured by boom camera 9*b* and/or hook camera 31. Control apparatus 35 is provided in cabin 17. Practically, control apparatus 35 may have a configuration in which CPU, ROM, RAM, HDD and the like are connected through a bus, or a configuration composed of one chip LSI and the like. Control apparatus 35 stores various programs and data for controlling operations of each actuator, the switching valve, the sensor and the like and processing image data.

Control apparatus 35 is connected with slewing sensor 27, telescoping sensor 28, luffing sensor 29, luffing sensor 29 and winding sensor 30, and can acquire slewing angle θz of slewing platform 7, telescopic length Lb, luffing angle θx, and feeding amount l of the wire rope.

Figure 3:
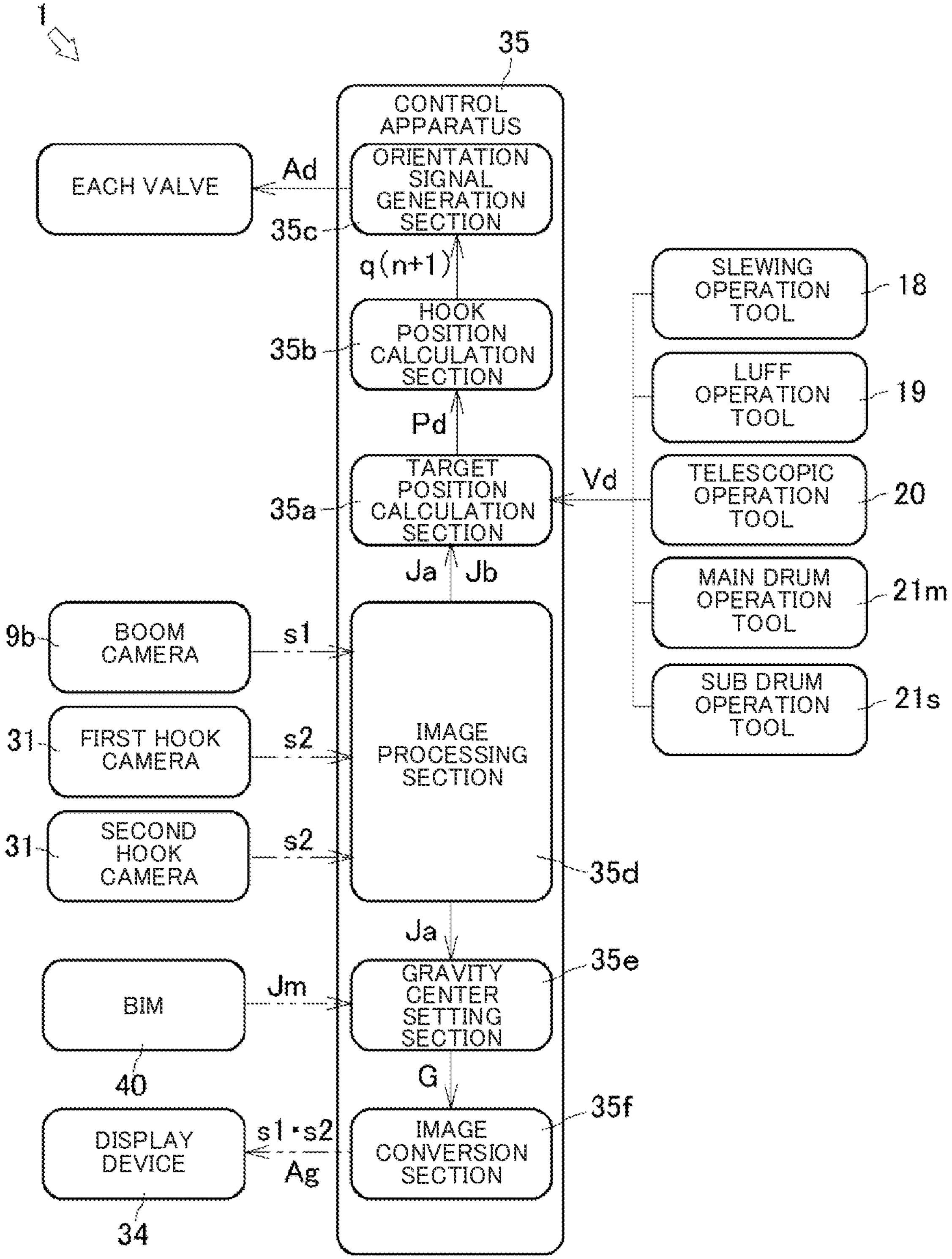
FIG. 3 is a block diagram illustrating a configuration of a control apparatus related to image processing on the crane.

As illustrated in FIG. 3, control apparatus 35 is connected with boom camera 9*b*. Control apparatus 35 can acquire image s1 captured by boom camera 9*b* and display image s1 on display device 34. In addition, control apparatus 35 is connected with communication machine 33 and display device 34. Control apparatus 35 can acquire image s2 captured by hook camera 31 and display image s2 on display device 34.

In addition, control apparatus 35 is connected with slewing operation tool 18, luff operation tool 19, telescopic operation tool 20, main drum operation tool 21*m* and sub drum operation tool 21*s*. When the operator manually operates crane 1, control apparatus 35 acquires the operation amount of each of slewing operation tool 18, luff operation tool 19, main drum operation tool 21*m* and sub drum operation tool 21*s*, and generates target speed signal Vd of sub hook 11*a* generated through the operation of each operation tool.

Then, on the basis of the operation amount (i.e., the above-mentioned target speed signal Vd) of slewing operation tool 18, luff operation tool 19, main drum operation tool 21*m* and sub drum operation tool 21*s*, control apparatus 35 generates actuator orientation signal Ad corresponding to each operation tool. Further, control apparatus 35 generates actuator orientation signal Ad on the basis of the result of the image processing of image s1 captured by boom camera 9*b* and image s2 captured by hook camera 31.

Control apparatus 35 is connected with slewing valve 23, telescoping valve 24, luffing valve 25, main valve 26*m* and sub valve 26*s*, and can transmit actuator orientation signal Ad to slewing valve 23, luffing valve 25, main valve 26*m* and sub valve 26*s*.

Control apparatus 35 includes target position calculation section 35*a*, hook position calculation section 35*b*, and orientation signal generation section 35*c*.

Target position calculation section 35*a* is a part of control apparatus 35, and calculates target position Pd as the movement target of sub hook 11*a* by performing image processing of images s1 and s2. In addition, hook position calculation section 35*b* is a part of control apparatus 35, and calculates hook position P as the current position information of sub hook 11*a* from the image processing result of the image captured by boom camera 9*b*. In addition, orientation signal generation section 35*c* calculates actuator orientation signal Ad as a command signal to crane 1.

Crane 1 having the above-mentioned configuration can move crane apparatus 6 to any position by running vehicle 2. In addition, crane 1 can increase the lifting height and/or operational radius of crane apparatus 6 by raising boom 9 to a given luffing angle θx using luffing hydraulic cylinder 12 through an operation of luff operation tool 19, and extending boom 9 to a given length of boom 9 through an operation of telescopic operation tool 20. In addition, crane 1 can move sub hook 11*a* to a given position by moving sub hook 11*a* up and down using sub drum operation tool 21*s* and the like, and slewing platform 7 through an operation of slewing operation tool 18.

In addition, in crane 1, sub hook 11*a* can be automatically moved to a predetermined position by control apparatus 35, not by the operation of each operation tool. The predetermined position is a position of sub hook 11*a* suitable for slinging of load W, and is, for example, the position of the lifting tool attached to load W or a position above the center of gravity of load W. In the following description, such a predetermined position is referred to as lifting position Ag. At the time point before load W is carried, crane 1 can move sub hook 11*a* to lifting position Ag of load W through automated driving.

As illustrated in FIG. 3, in control apparatus 35, image processing section 35*d* acquires images s1 and s2 captured by boom camera 9*b* and hook camera 31 and performs image processing, and thus image processing section 35*d* generates three-dimensional shape information Ja as information representing the three-dimensional shape of load W. On the basis of the generated three-dimensional shape information Ja, control apparatus 35 generates actuator orientation signal Ad corresponding to the state (such as the gravity center, the installation position and the orientation) of load W.

On the basis of the result of the image processing of images s1 and s2 of load W at control apparatus 35, crane 1 having the above-mentioned configuration can automatically raise boom 9 to a given luffing angle θx with luffing hydraulic cylinder 12, and automatically extend boom 9 to a given length of boom 9. In addition, on the basis of the result of the image processing of the image of load W at control apparatus 35, crane 1 can automatically move sub hook 11*a* to a given position by automatically moving sub hook 11*a* to a given vertical position, and automatically slewing platform 7 at a given slewing angle.

It is to be noted that crane 1 can be utilized for the use of installing load W at a predetermined position through automated driving by moving sub hook 11*a* to a position directly above load W that is installed at a predetermined position through automated driving. In the case where information on load W registered in BIM 40 includes the information representing installation position of load W, crane 1 can automatically carry load W to the installation position of load W.

Next, a configuration for achieving automated driving of crane 1 is described in more detail. First, a configuration in which crane 1 for detecting load W is described.

Control apparatus 35 acquires image s1 of load W captured by boom camera 9*b* and image s2 of the same load W captured at the same time by hook camera 31 by means of image processing section 35*d*. Image processing section 35*d* performs image processing on the basis of the principle of a stereo camera using images s1 and s2, and calculates information on the distance between sub hook 11*a* and load W and information representing the three-dimensional shape of load W (hereinafter referred to as three-dimensional shape information Ja). Three-dimensional shape information Ja is information representing the external shape of load W, and includes size information.

With gravity center setting section 35*e*, control apparatus 35 cross-checks the calculated three-dimensional shape information Ja and the information representing the three-dimensional shape of load W registered in BIM 40 (hereinafter referred to as master information Jm), and searches for master information Jm that matches three-dimensional shape information Ja in terms of the external shape and dimension. Then, when master information Jm that matches three-dimensional shape information Ja is detected, gravity center setting section 35*e* links that master information Jm as information on load W of images s1 and s2.

Master information Jm is information registered in BIM 40, in which information relating to the three-dimensional shape, weight, gravity center, and the like of load W is prepared for each type of load W. Master information Jm is prepared through preliminary entry into BIM 40 for each load W scheduled to be carried by crane 1.

Next, a configuration of display device 34 that displays detected load W is described in more detail.

As illustrated in FIG. 3, crane 1 includes display device 34. Display device 34 includes display 34*a* that can display image s1 captured by boom camera 9*b* (see FIG. 4B), and can display images s1 and s2 of load W captured by cameras 9*b* and 31 from above in real time. In addition, display device 34 can convert information representing gravity center G of load W set by gravity center setting section 35*e* into an image at image conversion section 35*f*, and display the image in a superimposed manner on images s1 and s2. With this configuration, the operator can confirm gravity center G of load W on display 34*a* of display device 34.

Figure 4A:
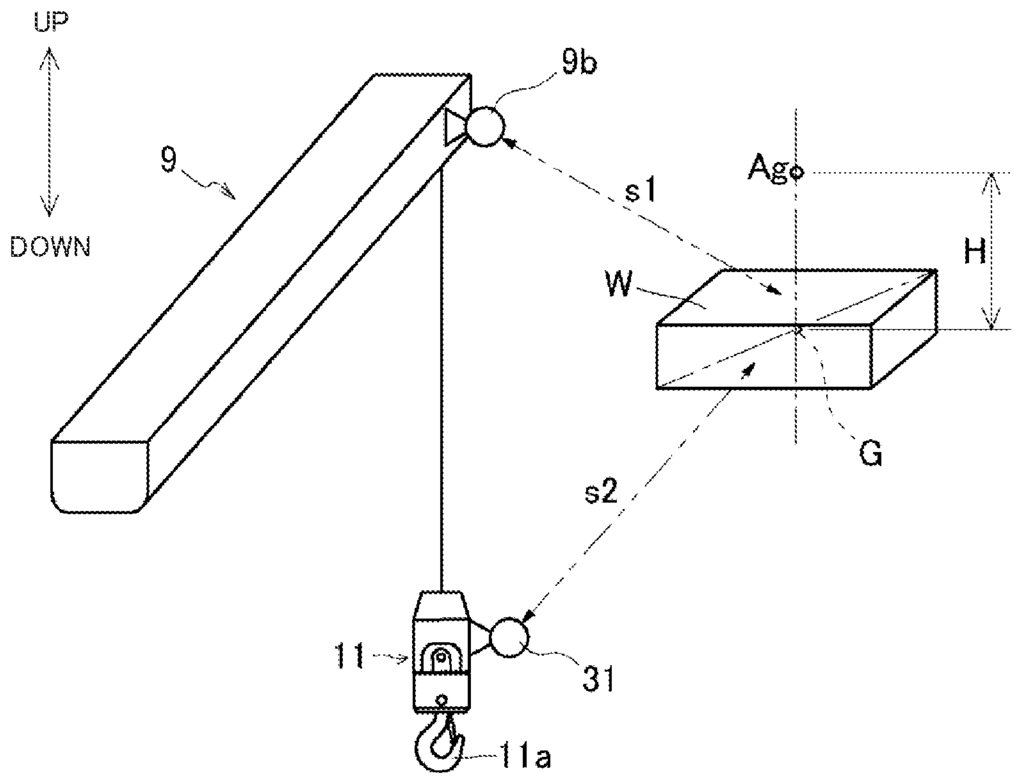
FIG. 4A is a drawing illustrating an image-capturing state of a load by the boom camera and the hook camera.
Figure 4B:
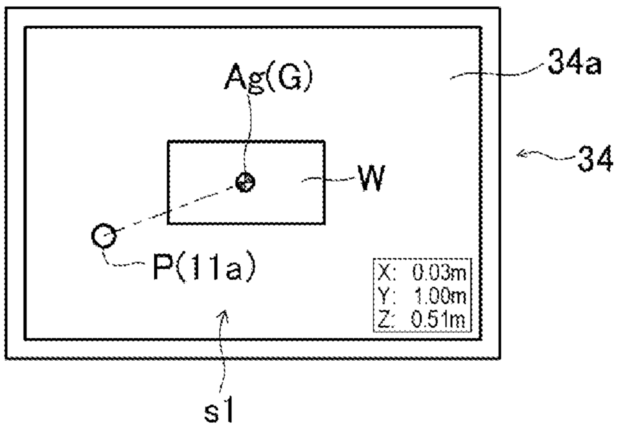
FIG. 4B is a drawing illustrating an image display state in the display device.

As illustrated in FIG. 4B, in crane 1, images s1 and s2 of load W and gravity center G are displayed on display device 34. Control apparatus 35 sets lifting position Ag of load W on the basis of calculated gravity center G of load W. As illustrated in FIG. 4B, control apparatus 35 displays set lifting position Ag and hook position P of sub hook 11*a* in a superimposed manner on images s1 and s2 including marker M on display 34*a* of display device 34. From display device 34, the operator can suitably determine the positional relationship between hook position P of sub hook 11*a* and lifting position Ag. In addition, the operator can dispose sub hook 11*a* at lifting position Ag by performing an operation such that the position of sub hook 11*a* matches lifting position Ag (gravity center G) while viewing the image displayed on display 34*a*.

In addition, as illustrated in FIG. 4B, display device 34 is configured such that the distance of sub hook 11*a* with respect to lifting position Ag is displayed in the form of numerical values as the distance of each axial direction of XYZ on display 34*a*, and that with the numerical values, the operator can determine the distance between sub hook 11*a* and lifting position Ag in the height direction, for example.

It is to be noted that display device 34 is configured to be capable of displaying image s2 captured by hook camera 31 instead of image s1 captured by boom camera 9*b* when hook camera 31 comes close to load W within a predetermined distance. Hook camera 31 can capture the image of load W at a position closer to load W in comparison with boom camera 9*b*, and can acquire a more detailed (higher-definition) image of load W. In this manner, by switching the camera image to be displayed in accordance with the distance between cameras 9*b* and 31 and load W, the closer the hook camera 31 is to load W, the greater the calculation accuracy of gravity center G can be in the image processing, thus making it possible to improve the positioning accuracy of sub hook 11*a*.

Next, a configuration for detecting gravity center G of load W in crane 1 is described.

Control apparatus 35 determines information representing the orientation of load W (hereinafter referred to as orientation information Jb) on the basis of calculated three-dimensional shape information Ja. Orientation information Jb is information representing the orientation (the direction in which it is disposed) of load W. In addition, control apparatus 35 acquires gravity center G of load W from linked master information Jm. and determines the three-dimensional coordinate of gravity center G of load W on the basis of orientation information Jb and gravity center G.

It is to be noted that while a configuration is described above in which three-dimensional shape information Ja of load W is calculated from image s1 of load W captured by boom camera 9*b* and image s2 of the same load W captured at the same time by hook camera 31 by control apparatus 35 through image processing on the basis of the principle of a stereo camera as illustrated in FIG. 4A and FIG. 4B, the method of calculating three-dimensional shape information Ja of load W is not limited to this.

Figure 5A:
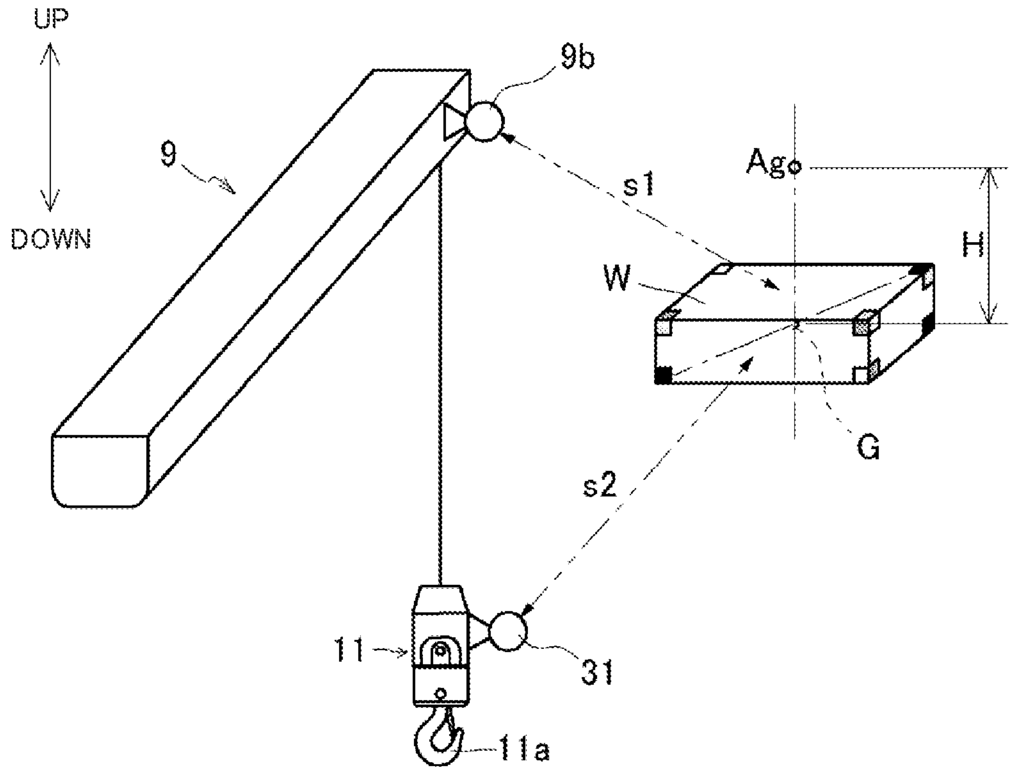
FIG. 5A is a drawing illustrating an image-capturing state of a load by the boom camera and the hook camera.

Alternatively, as illustrated in FIG. 5A, crane 1 may be configured to acquire three-dimensional shape information Ja and orientation information Jb of load W by providing a plurality of markers M on the surface of load W and reading the markers M by boom camera 9*b* and hook camera 31. For example, markers M with different types (such as color, shape, and pattern) are disposed at the side surfaces (e.g., corners) of load W and the images of three or more markers M are captured using boom camera 9*b* and hook camera 31, and thus, orientation information Jb is acquired based on the relative positional relationship of three or more markers M. By determining master information Jm of load W on the basis of marker M, crane 1 can acquire three-dimensional shape information Ja, and can further acquire orientation information Jb on the basis of the positional relationship between the markers M. It is to be noted that the information representing the types and positions of markers M provided for load W is registered in advance in BIM 40 or control apparatus 35.

Next, a configuration for setting lifting position Ag of load W in crane 1 is described.

On the basis of determined gravity center G, control apparatus 35 sets lifting position Ag at a position directly above it. Lifting position Ag is a position located on a vertical line passing through gravity center G of load W, and separated away from gravity center G by predetermined distance H on the upper side in the vertical direction as illustrated in FIG. 4A. Distance H is set in consideration of the size of load W, the length of the suspending wire used for slinging and the like. Lifting position Ag is set as three-dimensional coordinates.

It is to be noted that for example, in the case where a lifting tool such as an eyebolt is attached to load W and the eyebolt is at lifting position Ag of load W, lifting position Ag can be set by determining the presence of the lifting tool and the position of the lifting tool from an image processing result based on images s1 and s2, or lifting position Ag can be set on the basis of the information on the lifting tool (lifting tool position) registered in BIM 40 by registering the information on the lifting tool for load W in BIM 40 in advance.

Figure 5B:
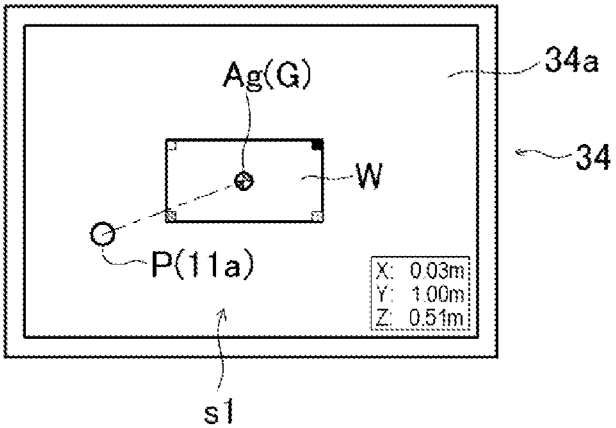
FIG. 5B is a drawing illustrating an image display state in the display device.

Alternatively, as illustrated in FIG. 5B, control apparatus 35 displays set lifting position Ag and hook position P of sub hook 11*a* in a superimposed manner on images s1 and s2 including marker M on display 34*a* of display device 34. From display device 34, the operator can suitably determine the positional relationship between hook position P of sub hook 11*a* and lifting position Ag.

Next, a control method of moving sub hook 11*a* to lifting position Ag is described. First, a first control method of moving sub hook 11*a* to lifting position Ag is described.

In the method of automatically moving sub hook 11*a* to lifting position Ag using the first control method, first, the operator of crane 1 operates crane 1 while viewing the display of display 34*a* of display device 34 such that the image of load W as the carrying object can be captured by boom camera 9*b*. Then, the operator designates (e.g., taps the screen) load W that is intended to carry from among loads W displayed on display 34*a*. In crane 1, the following automated driving is started when the operation of designating load W as the carrying object is performed by the operator.

Figure 6:
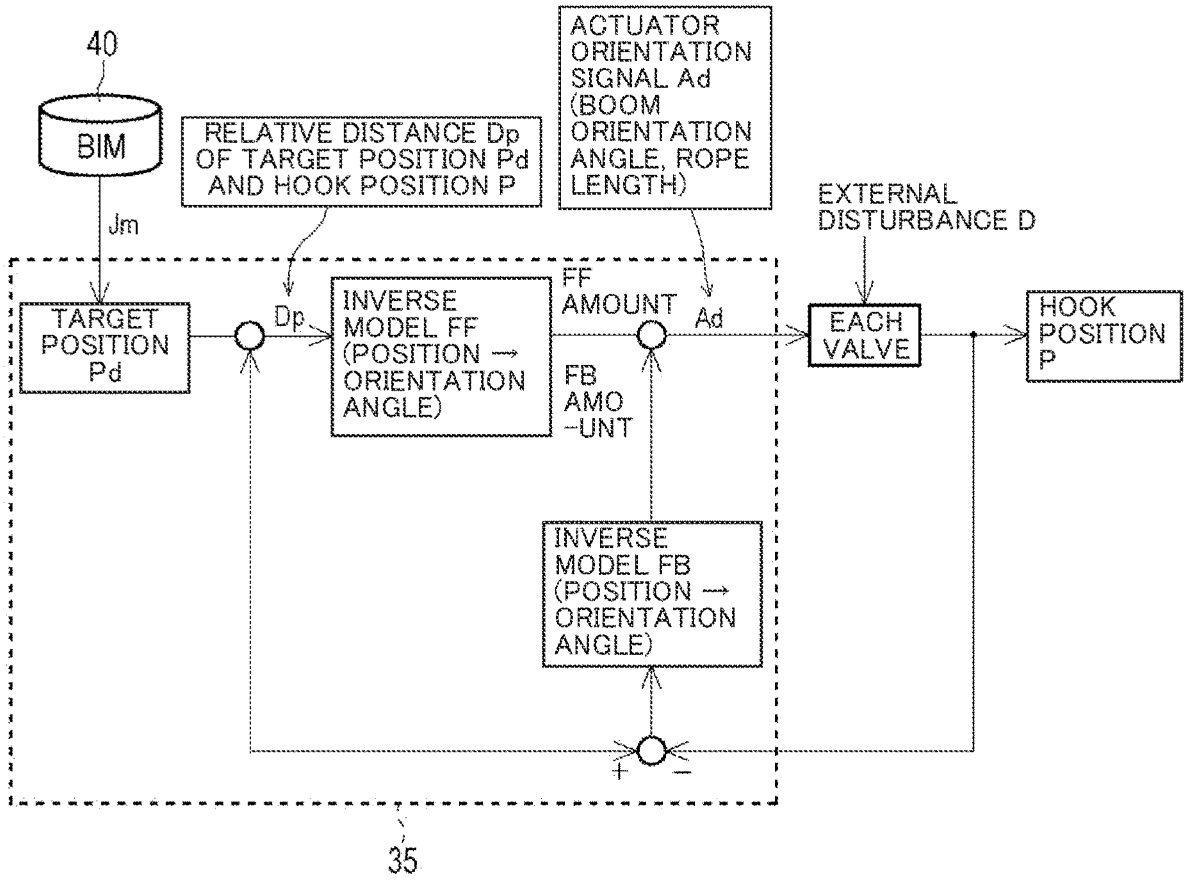
FIG. 6 is a flowchart of an automated driving control method of the crane on the basis of a result of image processing on a camera image.
Figure 7:
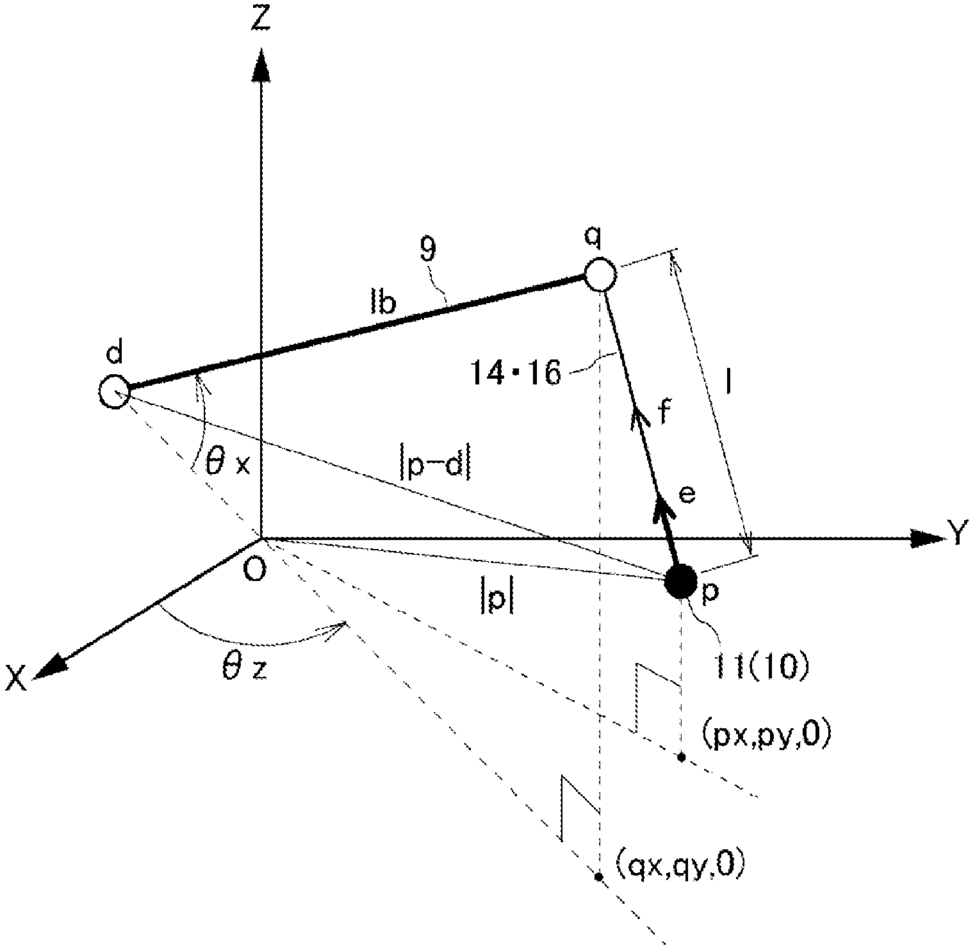
FIG. 7 is a drawing illustrating an inverse dynamics model of the crane.

When the automated driving is started, target position calculation section 35*a* of control apparatus 35 acquires images s1 and s2 from cameras 9*b* and 31 for each unit time t, determines the type of load W on the basis of three-dimensional shape information Ja and orientation information Jb obtained through image processing of images s1 and s2, and calculates target position Pd, as illustrated in FIG. 6. Then, target position calculation section 35*a* calculates target position Pd on the basis of master information Jm of load W registered in BIM 40. Target position Pd includes information representing gravity center G of load W and lifting position Ag.

Next, hook position calculation section 35*b* calculates hook position P as the current position information of sub hook 11*a* from the image processing result of image s1 captured by boom camera 9*b*.

Next, orientation signal generation section 35*c* calculates relative distance Dp of current hook position P and the set target position Pd. Here, orientation signal generation section 35*c* calculates relative distance Dp from the image processing result of the image captured by boom camera 9*b* and hook camera 31.

Next, orientation signal generation section 35*c* performs reverse model calculation based on calculated relative distance Dp, and calculates the feed-forward amount (also referred to as FF amount) of feeding amount l of the wire rope and the boom orientation angle (slewing angle θz, telescopic length lb, and luffing angle θx) for aligning hook position P to target position Pd. It is to be noted that in the reverse model calculation, the motion command required for achieving the desired motion result is calculated from the desired motion result.

At the same time, orientation signal generation section 35*c* calculates the feedback amount (also referred to as FB amount) of feeding amount l of the wire rope and the boom orientation angle (slewing angle θz, telescopic length lb and luffing angle θx) for aligning hook position P to target position Pd by feeding back current hook position P from crane information detected by each sensor and performing the reverse model calculation based on the difference from target position Pd.

Next, orientation signal generation section 35*c* calculates actuator orientation signal Ad as a command signal to crane 1 by adding up FF amount and FB amount.

In crane 1 including control apparatus 35 having the above-mentioned configuration, hook position P is brought closer to target position Pd by outputting calculated actuator orientation signal Ad to each valve by control apparatus 35. Then, control apparatus 35 repeatedly executes the calculation of actuator orientation signal Ad at a predetermined cycle until hook position P and target position Pd match each other. It is to be noted that control apparatus 35 determines that hook position P and target position Pd are matched when the distance between hook position P and target position Pd becomes equal to or smaller than a predetermined threshold value. Final hook position P is determined as a result in which the influence of external disturbance D is added to the operation of crane 1 based on actuator orientation signal Ad.

In crane 1 adopting such a control method, target position Pd is calculated based on the image captured by boom camera 9*b* and hook camera 31 and the position control is implemented based on the distance information, and thus, alignment errors can be reduced in comparison with by means of a speed control.

Next, a second control method of moving sub hook 11*a* to lifting position Ag is described. It is to be noted that the procedure up to the start of automated driving may be the same as that of the above-described first control method. When the automated driving is started, the following control method is executed.

Figure 8:
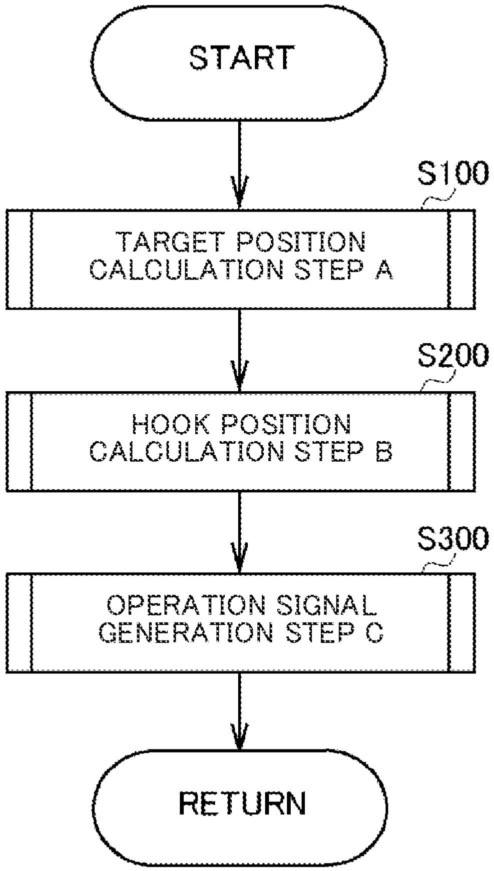
FIG. 8 is a flowchart of control steps on the basis of an inverse dynamics model of the crane.

In the second control method for moving sub hook 11*a* to lifting position Ag in crane 1, the inverse dynamics model of crane 1 is determined as illustrated in FIG. 8. The inverse dynamics model is defined by the XYZ-coordinate system as a global coordinate system, and the origin O is the slewing center of crane 1. The global coordinate of origin O is acquired from GNSS receiver 22. The q represents, for example, current position coordinate q(n) of the end of boom 9, and the p represents, for example, current position coordinate p(n) of sub hook 11*a*. The lb represents, for example, telescopic length lb(n) of boom 9, the θx represents, for example, luffing angle θx(n), and the θz represents, for example, slewing angle θz(n). The l represents, for example, feeding amount l(n) of the wire rope, the f represents, for example, tensile force f of the wire rope, and the e represents, for example, direction vector e(n) of the wire rope.

In the inverse dynamics model determined in the above-described manner, the relationship between target position q of the end of boom 9 and target position p of sub hook 11*a* is represented by Equation (1) from target position p of sub hook 11*a*, mass m of sub hook 11*a* and spring constant kf of the wire rope, and target position q of the end of boom 9 is calculated by Equation (2), which is a function of time for sub hook 11*a*.

[1]

$$m\ddot{p}=mg+f=mg+k_f(q-p) \quad (1)$$

[2]

$$q(t)=p(t)+l(t,\alpha)e(t)=q(p(t),\ddot{p}(t),\alpha) \quad (2)$$

where f: the tensile force of wire rope, kf: spring constant, m: the mass of sub hook 11*a*, *q*: the current position or target position of the end of boom 9, p: the current position or target position of sub hook 11*a*, l: the feeding amount of the wire rope, e: direction vector, and g: gravitational acceleration Low-pass filter Lp attenuates the frequency of a predetermined frequency or higher. Target position calculation section 35*a* prevents the generation of a singular point (abrupt positional variation) due to a differentiation operation by applying low-pass filter Lp to the signal of target position Pd. In the present embodiment, a fourth-order low-pass filter Lp is used to handle the fourth-order derivative in the calculation of the spring constant kf, but a low-pass filter Lp of any order can be applied to match the desired characteristics. The a and b in Equation (3) are coefficients.

$$G(s)=\frac{a}{(s+b)^4} \quad (3)$$

Feeding amount l(n) of the wire rope is calculated from the following Equation (4). Feeding amount l(n) of the wire rope is defined by the distance of current position coordinate q(n) of boom 9, which is the end position of boom 9, and current position coordinate p(n) of sub hook 11*a*, which is the position of sub hook 11*a*. That is, feeding amount l(n) of the wire rope includes the length of the slinging tool.

[4]

$$l(n)^2=|q(n)-p(n)|^2 \quad (4)$$

Direction vector e(n) of the wire rope is calculated from the following Equation (5). Direction vector e(n) of the wire rope is a vector of the unit length of tensile force f of the wire rope (see Equation (1)). Tensile force f of the wire rope is obtained by subtracting the gravitational acceleration from the acceleration of sub hook 11*a* calculated from current position coordinate p(n) of sub hook 11*a* and target position coordinates p(n+1) of sub hook 11*a* after unit time t has passed.

$$e(n)=\frac{f}{|f|}=\frac{\ddot{p}(n)-g}{|\ddot{p}(n)-g|} \quad (5)$$

Target position coordinates q(n+1) of boom 9, which is a target position of the end of boom 9 after unit time t has passed, is calculated from the following Equation (6) expressing Equation (1) as a function of n. Here, a represents slewing angle θz(n) of boom 9. Target position coordinates q(n+1) of boom 9 is calculated from feeding amount l(n) of the wire rope, target position coordinates p(n+1) of sub hook 11*a* and direction vector e(n+1) using the inverse dynamics.

[6]

$$q(n+1)=p(n+1)+l(n,\alpha)e(t+1)=q(p(n+1),\ddot{p}(n+1),\alpha) \quad (6)$$

Here, a configuration of control apparatus 35 for achieving the above-described second control method is described. Target position calculation section 35*a*, which can acquire images s1 and s2 from cameras 9*b* and 31 for each unit time t, determines the type of load W on the basis of three-dimensional shape information Ja and orientation information Jb obtained through image processing of images s1 and s2, and calculates target position Pd.

Hook position calculation section 35*b* calculates hook position P as the current position information of sub hook 11*a* from the image processing result of image s1 captured by boom camera 9*b*. In addition, hook position calculation section 35*b* may calculate hook position P as the position coordinates of sub hook 11*a* by acquiring feeding amount l(n) of main wire rope 14 or sub wire rope 16 (hereinafter referred to simply as "wire rope") from winding sensor 30 while calculating the position coordinates of the end of boom 9 from the orientation information of boom 9. In this case, hook position calculation section 35*b* acquires slewing angle θz(n) of slewing platform 7 from slewing sensor 27, acquires telescopic length lb(n) from telescoping sensor 28, and acquires luffing angle θx(n) from luffing sensor 29.

Then, hook position calculation section 35*b* calculates current position coordinate p(n) of sub hook 11*a*, which is acquired current hook position P. and calculates current position coordinate q(n) (hereinafter referred to simply as "current position coordinate q(n) of boom 9") of the end (the feed-out position of the wire rope) of boom 9, which is the current position of the end of boom 9, from acquired slewing angle θz(n), telescopic length lb(n) and luffing angle θx(n).

In addition, hook position calculation section 35*b* can calculate feeding amount l(n) of the wire rope from current position coordinate p(n) of sub hook 11*a* and current position coordinate q(n) of boom 9. Further, hook position calculation section 35*b* can calculate direction vector e(n+1) of the wire rope from which sub hook 11*a* is suspended from current position coordinate p(n) of sub hook 11*a* and target position coordinates p(n+1) of sub hook 11*a*, which is the target position of sub hook 11*a* after unit time t has passed. Hook position calculation section 35*b* is configured to calculate target position coordinates q(n+1) of boom 9, which is the target position of end of boom 9 after unit time t has passed, from target position coordinates p(n+1) of sub hook 11*a* and direction vector e(n+1) of the wire rope using the inverse dynamics.

Orientation signal generation section 35*c* generates actuator orientation signal Ad from target position coordinates q(n+1) of boom 9 after unit time t has passed. Orientation signal generation section 35*c* can acquire target position coordinates q(n+1) of boom 9 after unit time t has passed from hook position calculation section 35*b*. Orientation signal generation section 35*c* is configured to generate actuator orientation signal Ad to slewing valve 23, telescoping valve 24, luffing valve 25, main valve 26*m* or sub valve 26*s*.

With reference to FIG. 8, the following describes a step of calculation of the end of target position coordinates q(n+1) of boom 9 and calculation of target position Pd of sub hook 11*a* for generating actuator orientation signal Ad in control apparatus 35.

As illustrated in FIG. 8, at step S100, control apparatus 35 starts target position calculation step A. When lifting position Ag is calculated from acquired gravity center G of load W for each unit time t, and target position calculation step A is completed, control apparatus 35 proceeds the step to step S200.

At step 200, control apparatus 35 starts hook position calculation step B. When target position coordinates q(n+1) of boom 9 is calculated from current position coordinate p(n) of sub hook 11*a* and current position coordinate q(n) of boom 9, and hook position calculation step B is completed, control apparatus 35 proceeds the step to step S300.

At step 300, control apparatus 35 starts operation signal generation step C. When actuator orientation signal Ad of each of slewing valve 23, telescoping valve 24, luffing valve 25, main valve 26*m* or sub valve 26*s* is generated from slewing angle θz(n+1) of slewing platform 7, telescopic length Lb(n+1), luffing angle θx(n+1) and feeding amount l of the wire rope (n+1), and operation signal generation step C is completed, control apparatus 35 proceeds the step to step S100.

Control apparatus 35 calculates target position coordinates q(n+1) of boom 9 by repeating target position calculation step A, hook position calculation step B and operation signal generation step C, calculates wire rope direction vector e(n+2) from feeding amount l of the wire rope (n+1), current position coordinate p(n+1) of sub hook 11*a*, and target position coordinates p(n+2) of sub hook 11*a* after unit time t has passed, and further calculates target position coordinates q(n+2) of boom 9 after unit time t has passed from feeding amount l(n+1) of the wire rope and direction vector e(n+2) of the wire rope. That is, control apparatus 35 calculates direction vector e(n) of the wire rope, and sequentially calculates target position coordinates q(n+1) of boom 9 after unit time t from current position coordinate p(n+1) of sub hook 11*a*, target position coordinates p(n+1) of sub hook 11*a*, and direction vector e(n) of the wire rope using the inverse dynamics. Control apparatus 35 controls each actuator through a feed-forward control that generates actuator orientation signal Ad on the basis of target position coordinates q(n+1) of boom 9.

By adopting the above-described control method, crane 1 calculates target position Pd on the basis of the image captured by boom camera 9*b* and hook camera 31, and the position control is implemented based on the distance information, and thus, alignment errors can be reduced in comparison with the alignment of the related art using a speed control. In addition, crane 1 applies a feed-forward control in which a control signal of boom 9 is generated with respect to the distance of target position Pd and hook position P. and a control signal of boom 9 is generated based on the target trajectory intended by the operator. Thus, crane 1 has a small response delay to an operation signal, and suppresses sway of load W due to a response delay. In addition, the inverse dynamics model is constructed and target position coordinates q(n+1) of boom 9 is calculated from direction vector e(n) of the wire rope, current position coordinate p(n+1) of sub hook 11*a*, and target position coordinates p(n+1) of sub hook 11*a*, and no error in the transient state due to acceleration/deceleration is caused. Further, since frequency components, including singular points, generated by differential operations in calculation of target position coordinates q(n+1) of boom 9 are attenuated, the control of boom 9 is stabilized. In this manner, when sub hook 11*a* is moved to lifting position Ag as the target position, sway of sub hook 11*a* can be suppressed.

Figure 9:
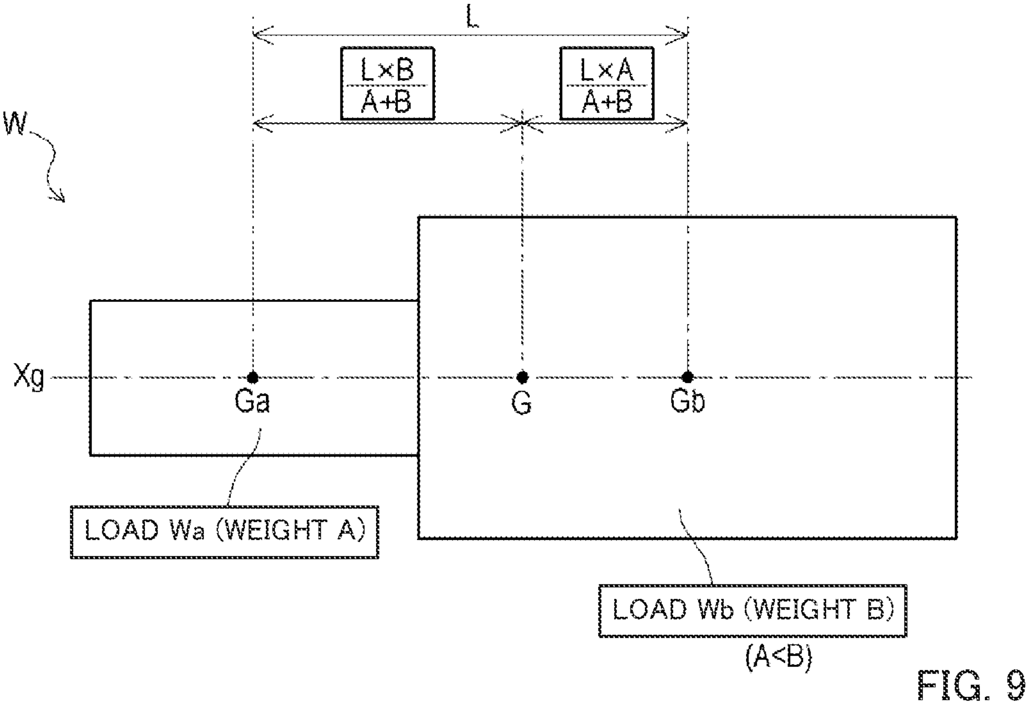
FIG. 9 is a schematic view illustrating a method of calculating a gravity center of a load as a composite.

Next, with reference to FIG. 9, the method of calculating gravity center G in the case where load W is a composite of a plurality of loads coupled together is described. The following describes an exemplary method of calculating gravity center G in the case where load W is a composite composed of two loads Wa and Wb combined (coupled) together.

Weight A and gravity center Ga of load Wa are known with information registered in BIM 40. In addition, weight B and gravity center Gb of load Wb are known with information registered in BIM 40. When load W is formed by coupling load Wa and load Wb together, the weight of load W is (A+B). In addition, gravity center G of load W is located on straight line Xg connecting gravity center Ga and gravity center Gb. The position of gravity center G of load W on straight line Xg is determined by the weight ratio of load Wa and load Wb.

In crane 1, information representing each of loads Wa and Wb can be acquired from BIM 40 and therefore control apparatus 35 can acquire information (the weight, gravity center, orientation, and shape after the coupling) of each of loads Wa and Wb from BIM 40 and calculate gravity center G of load W as a coupled member through the above-mentioned computation. It is to be noted that in the case where load W is a composite composed of three or more loads, gravity center G of load W can be calculated through an application of the above-mentioned calculation. It is to be noted that in the case where a schedule of lifting to be performed by crane 1 after load Wa and load Wb are combined is known in advance, information (the weight, gravity center, orientation, and shape) of load W as a composite may be registered in advance in BIM 40 and the information on load W as a composite may be directly utilized.

Next, a configuration for detecting load W as a composite is described. The following describes an exemplary case where load W is a composite composed of three loads W1, W2 and W3.

Figure 10A:
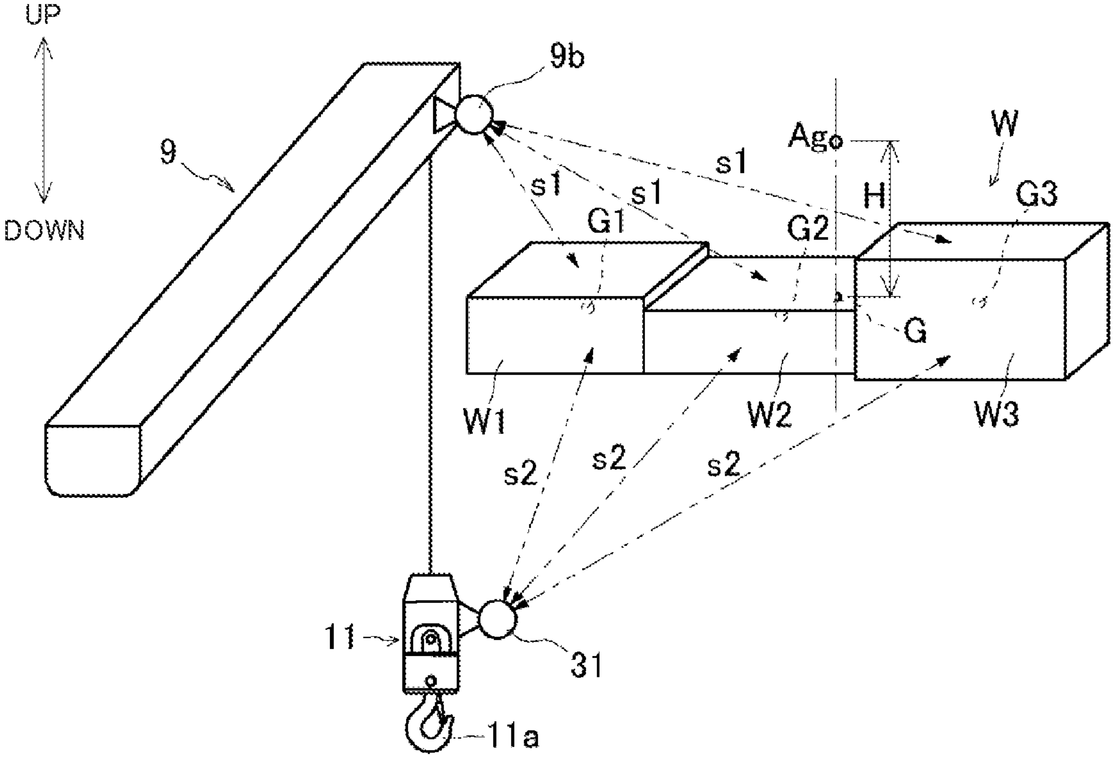
FIG. 10A is a drawing illustrating an image-capturing state of a load by the boom camera and the hook camera.

As illustrated in FIG. 10A, control apparatus 35 acquires, at image processing section 35*d*, images s1 of load W composed of three loads W1, W2 and W3 captured by boom camera 9*b*, and images s2 of the same load W captured at the same time by hook camera 31. Image processing section 35*d* calculates three-dimensional shape information Ja of load W by performing image processing on the basis of the principle of a stereo camera from images s1 and s2.

Control apparatus 35 detects that load W is composed of three loads W1, W2 and W3 on the basis of three-dimensional shape information Ja. Then, control apparatus 35 calculates individual three-dimensional shape information Ja1, Ja2 and Ja3 for three loads W1, W2 and W3, respectively.

With gravity center setting section 35*e*, control apparatus 35 cross-checks calculated three-dimensional shape information Ja1, Ja2 and Ja3 and master information Jm registered in BIM 40, and searches for master information Jm1, Jm2 and Jm3 that match three-dimensional shape information Ja1, Ja2 and Ja3 in terms of the external shape and the size. Then, when master information Jm1, Jm2 and Jm3 that match three-dimensional shape information Ja1, Ja2 and Ja3 are detected, gravity center setting section 35*e* links master information Jm1, Jm2 and Jm3 thereto as information on loads W1, W2 and W3 according to images s1 and s2.

Next, a configuration for detecting gravity center G of load W as a composite is described.

Control apparatus 35 determines orientation information Jb1, Jb2 and Jb3 according to the orientation of loads W1, W2 and W3 constituting load W from calculated three-dimensional shape information Ja1, Ja2 and Ja3. In addition, control apparatus 35 acquires gravity centers G1, G2 and G3 of loads W from linked master information Jm, and determines the three-dimensional coordinate of gravity center G of load W on the basis of orientation information Jb1, Jb2 and Jb3 and gravity centers G1, G2 and G3.

Figure 10B:
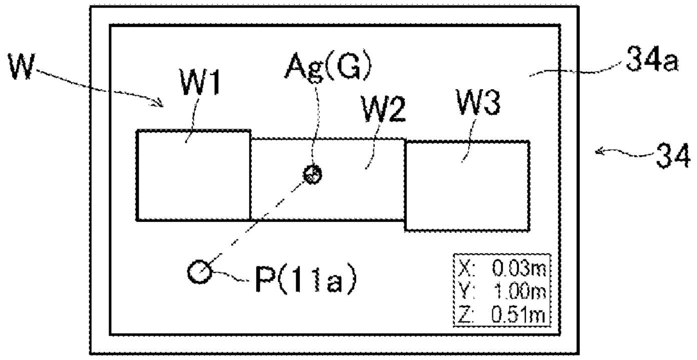
FIG. 10B is a drawing illustrating an image display state in the display device.

Then, control apparatus 35 sets lifting position Ag of load W on the basis of calculated gravity center G of load W. As illustrated in FIG. 10B, control apparatus 35 displays lifting position Ag and hook position P of sub hook 11*a* set to load W in a superimposed manner on images s1 and s2 on display 34*a* of display device 34. From display device 34, the operator can suitably determine the positional relationship between hook position P of sub hook 11*a* and lifting position Ag.

Control apparatus 35 calculates gravity center G of load W as a composite by separately handling loads W1, W2 and W3 in the above-described example; however, in the case where three-dimensional shape information Ja is registered in BIM 40 as load W as a composite, a configuration may be adopted in which orientation information Jb of load W as a composite is calculated by utilizing three-dimensional shape information Ja of BIM 40 and handling load W as a unitary member, and gravity center G of load W as a composite is directly calculated from three-dimensional shape information Ja and orientation information Jb by means of control apparatus 35.

Alternatively, in the case where load W is a composite composed of three loads W1, W2 and W3, crane 1 may set lifting position Ag by acquiring three-dimensional shape information Ja and orientation information Jb of load W on the basis of marker M provided in loads W1, W2 and W3, and calculating gravity center G of load W.

Figure 11A:
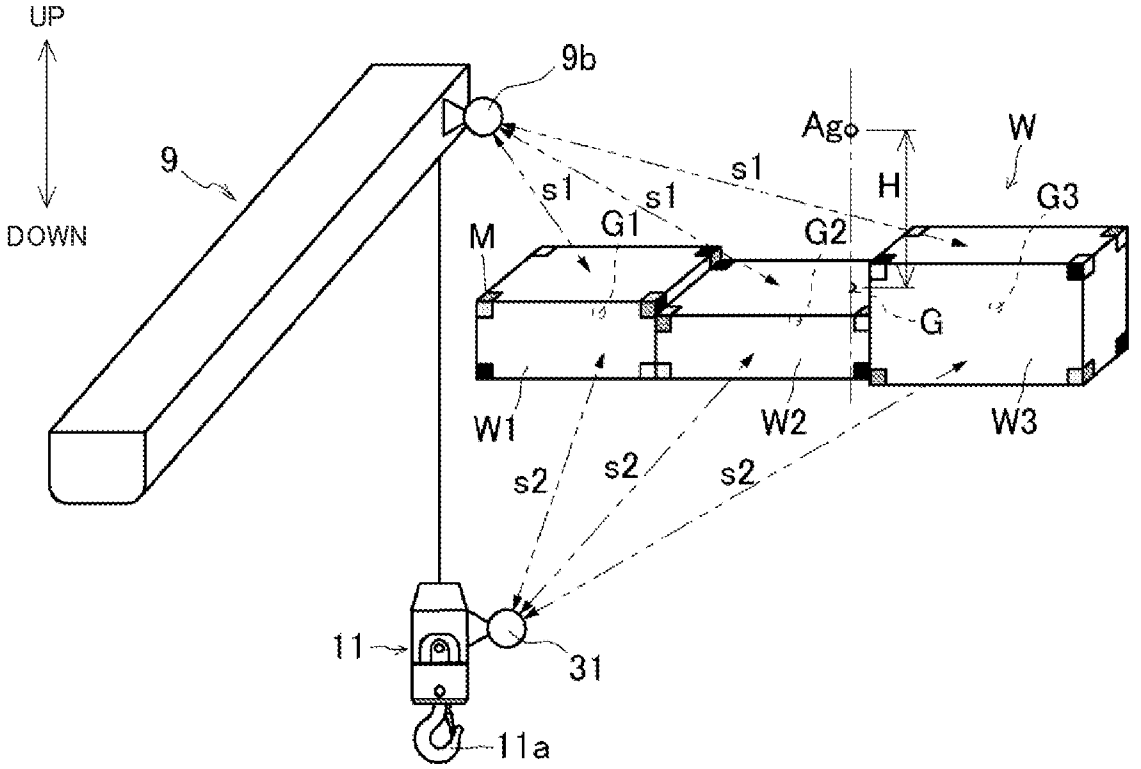
FIG. 11A is a drawing illustrating an image-capturing state of a load by the boom camera and the hook camera.

As illustrated in FIG. 11A, crane 1 can acquire three-dimensional shape information Ja and orientation information Jb of load W by reading a plurality of markers M provided at the surface of load W by boom camera 9*b* and hook camera 31.

In this case, control apparatus 35 may calculate gravity center G of load W after gravity centers G1, G2 and G3 are calculated by separately handling loads W1, W2 and W3, or, in the case where three-dimensional shape information Ja of load W as a composite is registered in BIM 40, control apparatus 35 may directly calculate gravity center G of load W as a composite by acquiring three-dimensional shape information Ja and orientation information Jb on the basis of information obtained by reading marker M by control apparatus 35 by handling load W as a unitary member.

Figure 11B:
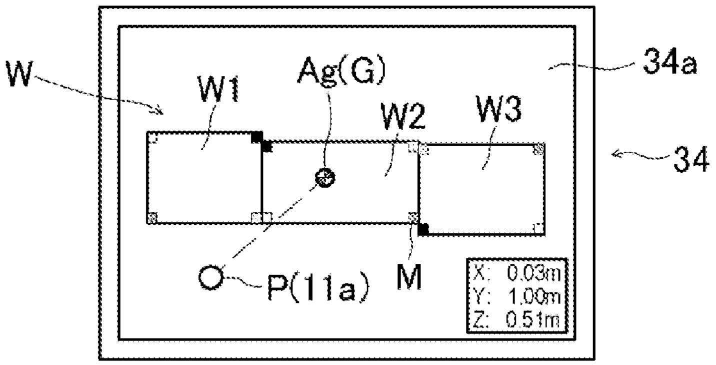
FIG. 11B is a drawing illustrating an image display state in the display device.

Then, control apparatus 35 sets lifting position Ag of load W on the basis of calculated gravity center G of load W. As illustrated in FIG. 11B, control apparatus 35 displays set lifting position Ag and hook position P of sub hook 11*a* in a superimposed manner on images s1 and s2 including marker M on display 34*a* of display device 34. From display device 34, the operator can suitably determine the positional relationship between hook position P of sub hook 11*a* and lifting position Ag.

While crane 1 that is a mobile crane is exemplified in the present embodiment, the technique of the automated driving of the hook according to the present invention is applicable to various apparatuses configured to lift load W by a hook. In addition, crane 1 may be configured to perform remote operation using a remote control terminal including an operation stick to instruct the movement direction of load W by the tilt direction, and instruct the movement speed of load W by the tilt angle. In this case, in crane 1, by displaying the image captured by the hook camera on a remote control terminal, the operator can suitably determine the states in a region around load W from remote locations. In addition, crane 1 can improve the robustness by feeding back the current position information of load W based on the image captured by the hook camera. Thus, crane 1 can stably move load W without thinking about variation in characteristics due to the weight of load W and external disturbance.

The above-mentioned embodiments are merely representative forms, and can be implemented in various variations to the extent that they do not deviate from the gist of an embodiment. It is of course possible to implement the invention in various forms, and the scope of the invention is indicated by the description of the claims, and further includes all changes within the meaning and scope of the equivalents of the claims.

INDUSTRIAL APPLICABILITY

The present invention can be applied to cranes.

REFERENCE SIGNS LIST

1 Crane
7 Slewing platform
9 Boom
9*b* Boom camera (First camera)
10 Main hook block (Hook block)
10*a* Main hook (Hook)
11 Sub hook block (Hook block)
11*a* Sub hook (Hook)
31 Hook camera (Second camera)
35 Control apparatus
S1 Image (of first camera)
S2 Image (of second camera)
W Load
G Gravity center (of load)

The invention claimed is:

1. A crane in which a boom configured to be freely raised and lowered is provided on a slewing platform, and a hook block and a hook suspended from the boom are provided, the crane further comprising:

a first camera provided at the boom and configured to capture an image of a load as a carrying object that is carried by the crane;

a second camera provided at the hook block and configured to capture an image of the load from a perspective different from the first camera; and a control apparatus configured to calculate a lifting position of the load by image processing on the image of the load captured by the first camera and the second camera.

2. The crane according to claim 1, wherein the control apparatus is configured to control the crane to automatically move the hook to the lifting position that is calculated.

3. The crane according to claim 2, wherein the control apparatus is configured to control the crane to automatically move the hook to the lifting position through a control based on an inverse dynamics model.

4. The crane according to claim 1, wherein the lifting position is a position of a lifting tool attached to the load.

5. The crane according to claim 1, wherein the lifting position is a position set at a location above the load on a vertical line passing through a gravity center of the load.

6. The crane according to claim 5, wherein the control apparatus calculates the gravity center of the load by performing image processing on the image.

7. The crane according to claim 6, wherein the control apparatus is configured to communicate with a storage apparatus in which shape information of the load is stored, acquire the shape information of the load from the storage apparatus, and calculate the gravity center based on information obtained through the image processing on the image and the shape information of the load.

8. The crane according to claim 1, wherein the load is a composite composed of a plurality of the loads combined together.

* * * * *